United States Patent
Riesmeier

(10) Patent No.: US 6,286,198 B1
(45) Date of Patent: Sep. 11, 2001

(54) PROCESS FOR PRODUCING BASIC FURNITURE STRUCTURE

(76) Inventor: Wilhelm Riesmeier, Franz-Liszt-Str. 5, D-32312 Lübbecke (DE)

( * ) Notice: Subject to any disclaimer, the term of this patent is extended or adjusted under 35 U.S.C. 154(b) by 0 days.

(21) Appl. No.: 09/266,446

(22) Filed: Mar. 11, 1999

(30) Foreign Application Priority Data

Mar. 18, 1998 (DE) .................................. 198 11 767
Oct. 27, 1998 (DE) .................................. 198 49 504

(51) Int. Cl.$^7$ .............................. B23P 11/00; B23P 17/00
(52) U.S. Cl. ........................... 29/525.01; 403/401; 29/11
(58) Field of Search ........................... 29/11, 525.01, 29/897.32; 403/401, 402, 291

(56) References Cited

U.S. PATENT DOCUMENTS 2,255,151 * 9/1941 Clements .............................. 403/402
4,142,931 * 3/1979 Viol et al. ............................. 156/257

FOREIGN PATENT DOCUMENTS

3821611 * 12/1989 (DE) .
4323408 * 1/1995 (DE) .
497288 * 12/1938 (GB) .................................. 403/402
10281118 * 10/1998 (JP) .

* cited by examiner

Primary Examiner—S. Thomas Hughes
Assistant Examiner—Jermie E. Cozart
(74) Attorney, Agent, or Firm—Charles E. Baxley

(57) ABSTRACT

A structure is formed by folding a panel along one or more V-grooves cut in the inside surface of the panel. The verticies formed by the V-groove on the folded panel includes film hinges which are formed by injecting a plastic material in a groove formed on the outside surface of the panel.

19 Claims, 4 Drawing Sheets

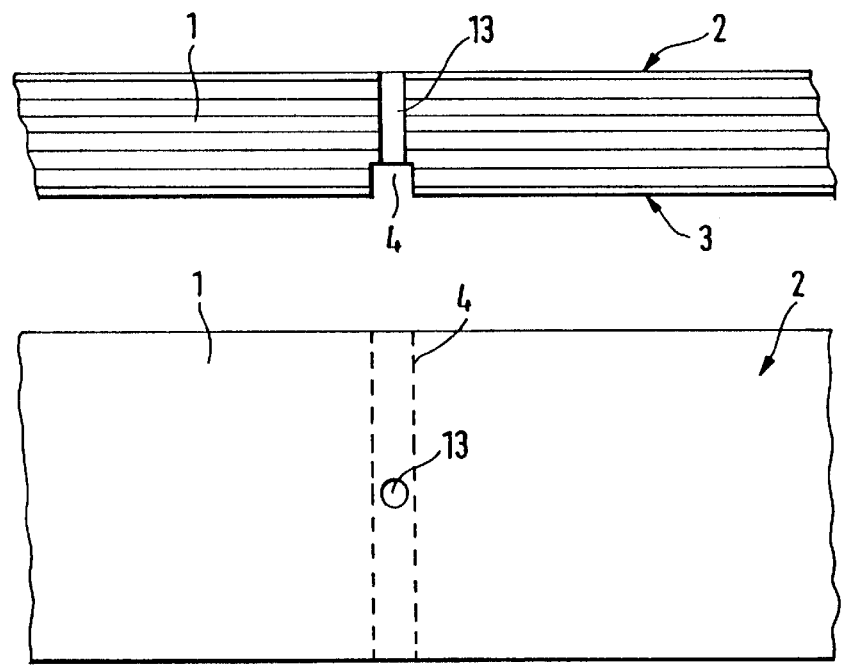
FIG.1
FIG.1A
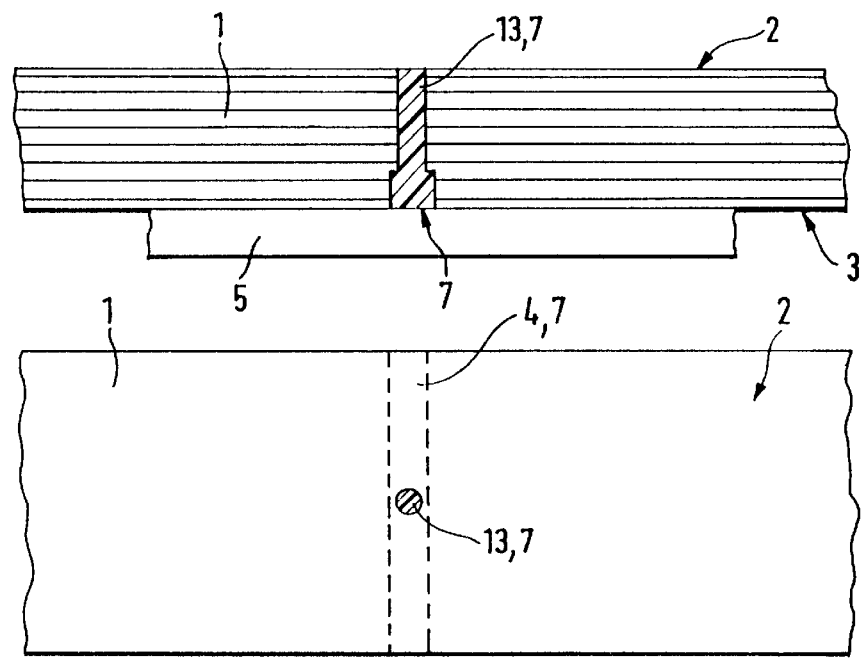
FIG.2
FIG.2A

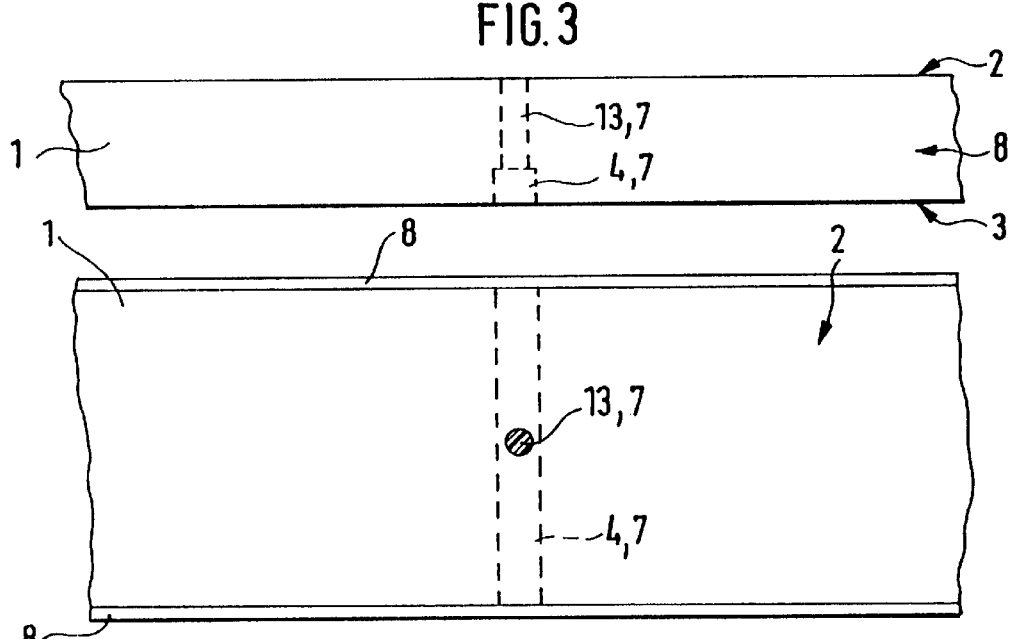
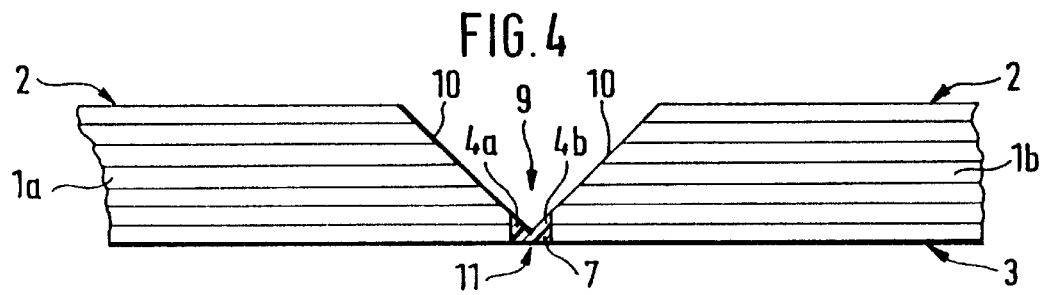
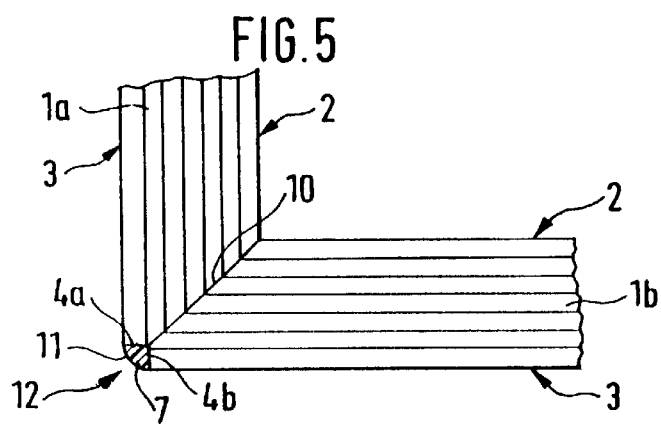

PROCESS FOR PRODUCING BASIC FURNITURE STRUCTURE

BACKGROUND OF THE INVENTION

1. Field of the Invention

The present invention relates generally to the field of furniture and more particularly to a basic furniture structure and a process for producing the basic furniture structure.

2. Prior Art

The prior art related to furniture includes the so-called sheet-building process, by which V-shaped grooves, of which the V-angle is usually 90 degrees, are milled into a panel in the form of a starting workpiece. The grooves are milled along the corner edges which are to be formed on the subsequent inner side of the basic structure. These grooves are made to extend into the vicinity of the outside of the resulting basic structure sides. A film hinge is formed in the vertex region of each individual V-groove which comprises either the coating substance of the relevant panel material or a sheet or film strip adhesively bonded on the outside of the starting panel. This film hinge forms a pivot axis in order for it to be possible for the respectively adjacent basic structure sides to be pivoted or folded toward one another over an angle which corresponds to the V-angle of the cut grooves whereupon the miter surfaces formed by the V-groove, that is the beveled narrow surface sides of the basic structure sides, butt against one another and can be connected to one another by the addition of an adhesive or glue. If the film hinge is formed by adhesively bonded sheet or film strips, the film strips are removed once the basic structure sides have been folded together.

The starting panels are usually coated on the outside with thermoset materials, and the resulting cover layer is not particularly suitable for the sheet-folding process because, due to partially different bending properties, it results in a nonlinear, usually slightly undulating edge formation. There are also often undesirably sharp corner edges between the adjacent panel parts, which cannot be avoided even when adhesively bonded sheets or films are used as film hinges. In the case of coating materials which tend to rupture, such as veneers, the adhesive bonding of sheet or film strips as film hinge is essential and extremely sharp edges are only produced once the folding has been carried out and the sheet or film strips have been removed.

OBJECTS AND SUMMARY OF THE INVENTION

It is therefore an object of the present invention to provide a furniture structure which is formed by folding a panel member which incorporates a V-groove and a film hinge.

Another object of the present invention is to provide a process for forming a furniture structure by folding a panel member.

The foregoing and other objects and advantages of the present invention will appear more clearly hereinafter.

In accordance with the present invention there is provided a basic furniture structure which incorporates a film hinge which cooperates with a V-groove formed in a starting panel.

The film hinge, rather than being formed by the material of the starting panel, such as the coating material of the latter, is formed by an appropriate plastic material which is introduced into a groove which is milled into the starting panels on the subsequently external sides, along a folding line or the hinge axis. There are suitable plastic materials which, in the solidified state, have a sufficient bending capacity and tear strength in order to be able to form the film hinge. These may be plastics which exhibit elasticity or plasticity for the duration of processing and only subsequently solidify in full.

It is also possible to use permanently flexible plastic materials, such as thermoplastics which, depending on the aesthetic form desired along the outer corner edge of the panel parts, which are connected diagonally to one another. There may thus be a contrast on the outside between the color of the plastic material which forms the film hinge and that of the coating material of the panel parts.

The process according to the present invention can be used to produce two furniture structures which can have various configurations along its visible outer edges.

BRIEF DESCRIPTION OF THE DRAWINGS

Other important objects and advantages of the present invention will be apparent from the following detailed description taken in connection with the accompanying drawings wherein like numerals refer to like parts and in which:

FIG. 1 is a fragmentary plan view of a panel made according to the present invention which forms the starting material for the fabrication of a basic furniture structure with the panel shown after completion of the injection channel step;

FIG. 1A is a fragmentary cross-sectional view of the panel of FIG. 1;

FIG. 2 is a fragmentary plan view of the panel of FIG. 1, after the completion of the injection step;

FIG. 2A is a fragmentary cross-sectional view of the panel of FIG. 2;

FIG. 3 is a fragmentary plan view of the panel of FIG. 1, after the addition of edge strips;

FIG. 3A is a fragmentary side view of the panel of FIG. 3;

FIG. 4 is a fragmentary cross-sectional view of the panel of FIG. 3, after the completion of the V-groove;

FIG. 5 is a fragmentary cross-sectional view of the panel of FIG. 4, after the panel has been pivoted to form the corner of a structure;

DETAILED DESCRIPTION OF THE INVENTION

Figure 6:
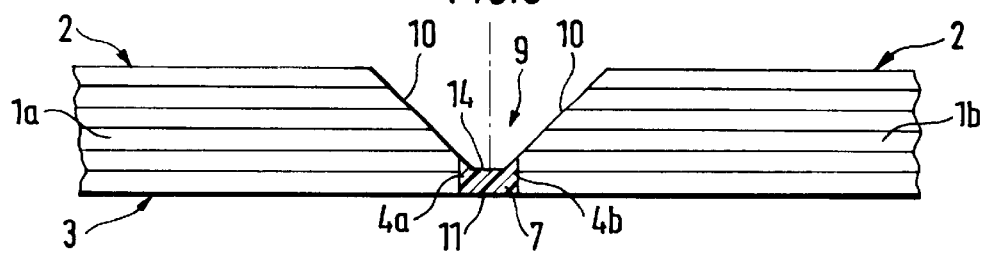
FIG. 6 is a fragmentary cross-sectional view of an alternative embodiment of the panel of FIG. 1.

Referring to the drawings, wherein like reference numbers designate like or corresponding parts throughout, there is shown in FIGS. 1–11 a basic furniture structure made in accordance with the present invention and a process for manufacturing the furniture structure.

FIGS. 1 and 1A show a planar panel 1 from which panel parts are formed. The panel parts form basic structure sides and from which it is possible to form a basic structure, for example, for a piece of kitchen furniture. The basic structure has internal sides, which are formed by the inner side 2 of the panel 1, which is illustrated as being oriented upward in FIG. 1A. Correspondingly, the side of the panel 1 which is oriented downward in the drawing forms the outer side 3, which is processed first. Panel 1 usually comprises a clipboard material which is coated on both sides with a coating material, such as an HPL board. Grooves 4, which have a rectangular or square cross-section, are milled in on the outer side 3 of the usually square or rectangular panel 1, parallel to one of the square or rectangle sides.

Instead of the single-piece panel 1, which is subsequently formed into panel parts to form the basic structure 5, it is also possible to use separate panel parts which are of the same thickness or different thicknesses and which are joined to form the panel 1. Accordingly these panel parts are joined to one another by way of their narrow-surface sides and then fixed. The joint running between the panel parts in each case extends along the corner edge which is subsequently to be formed. These panel parts are processed in the same way as a single-piece panel, including the operation for providing the above mentioned groove 4.

As shown in FIG. 2, a plastic material is injected into the grooves 4. The plastic material 7 is made of a suitable liquefiable plastic. The injected plastic solidifies in the groove 4, whereupon it retains either temporary or permanent elasticity. For the purpose of injecting the plastic material 7 of the respective groove 4 has to be covered in a sealed manner. For this purpose, the panel 1 is forced against a suitable abutment 5, which seals off at least the groove 4 which is to be filled with the plastic material 7 along the longitudinal side opening which is located in the plane of the outer side 3 of the panel 1. In this abutment 5 there may be provided one or more injection channels or injection nozzles through which the liquid plastic material 7 is pressed into the groove. It is also possible for the abutment 5 to be part of a movable injection apparatus which can be moved up against the outer side 3 of the panel 1 for the injection operation when the abutment 5 is secured in a stationary manner. The abutment 5 expediently forms a rest on which the panel 1 is positioned. A suitable coating of the abutment 5 ensures that residues of plastic cannot adhere or that adhering residues of plastic can be easily removed. For this purpose, it is also possible to use special release agents.

In another alternative configuration of the present invention, either before or after the groove 4 has been milled, injection channels 13 are bored for the injection of the plastic material 7 in the direction of the groove 4, the channels passing through from the inner side 2 to the outer side 3 of the panel 1 and either opening out into the relevant groove 4 or, if the groove 4 is cut in subsequently, being intersected by the groove 4. The state which is illustrated in FIGS. 1 and 1A is achieved once the injection channel 13 has been bored and the groove 4 has been provided on the outer side 3 of the panel 1.

FIG. 2A shows how the respective groove 4 is covered in a sealed manner for the injection of the plastic material 7. For this purpose, the panel 1 is positioned on a rest 5 with its outer side 3 oriented downwards, the rest 5 sealing off the opening side of at least the groove 4 which is to be injection filled in each case or of all the grooves 4. The plastic material 7 is then injected from the inner side 2 of the panel 1 through the injection channels 13, which likewise fill with the plastic material 7.

It is possible, as a result of displacement, for the sealing of the grooves 4 to produce a build-up of air in the material of the panel 1. This build-up can be prevented by venting grooves or channels being milled, along the grooves 4, on the top, inner side 2 of the panel 1. This may be expedient particularly when the panel 1 is provided with an airtight cover layer. If the venting grooves intersect the injection channels 13, it has to be ensured that the injection nozzle, which is to be attached at the top opening of the injection channels 13, nevertheless has a sealed connection.

In a subsequent step, edge strips 8 are fitted to those narrow sides of the panel 1 which run transversely with respect to the injection-filled groove 4 and the edge strips 8 are glued or adhesively bonded firmly in place, resulting in the state of the panel 1 which can be seen in FIG. 3.

Thereafter, V-shaped grooves, which are referred to hereinbelow simply as V-grooves 9, are milled into the panel 1 through the edge strips 8 from the inner side 2. This can be seen in FIG. 4. The milling of the V-grooves 9 simultaneously removes the channels 13, filled with the plastic material 7, as can likewise be seen from FIG. 4. It can also be seen here that the longitudinal center plane of the V-groove 9, which is also the plane of symmetry of the V-groove 9, is in alignment in the direction of the thickness of the panel 1 with the longitudinal center of one of the grooves 4. In each case, these grooves 4 are also symmetrical in the same way. The vertex line of the V-groove 9 extends at least as far as the plastic material 7 which has been injected into the respective groove 4 and the V-groove 9 is preferably cut right into the plastic material 7. Further details of this construction are described hereinbelow with reference to FIG. 6.

Figure 10:
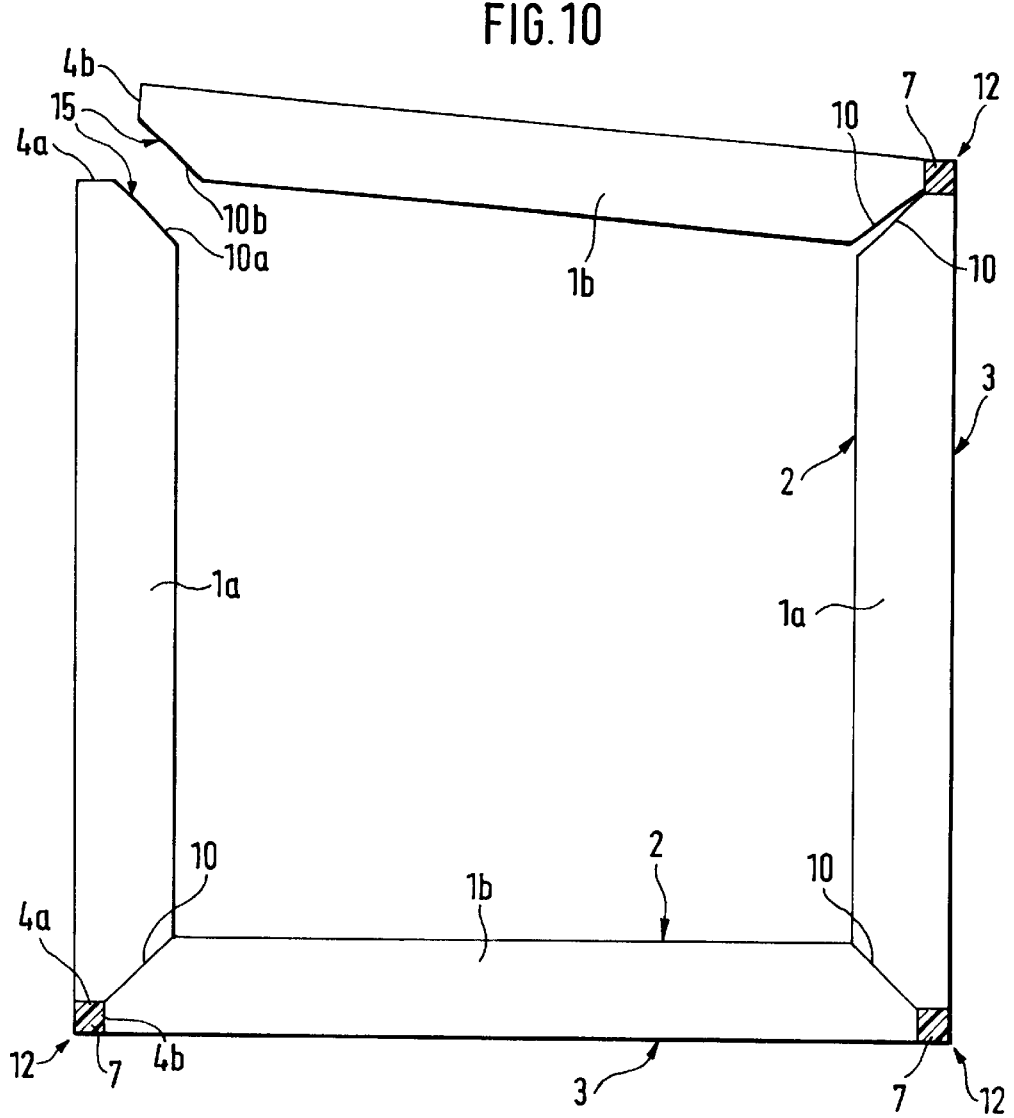
FIG. 10 is an end view of a furniture structure showing four corner edges.

The milling of the V-shaped grooves 9 forms adjacent basic structure sides 1a and 1b which have narrow surface sides which are adjacent to one another. The narrow surface sides are in the form of the flanks 10 of the V-grooves 9, and the two flanks 10 of each V-groove 9 are at right angles to one another. This is necessary so that in the end position, the two adjacent basic structures sides 1a and 1b are at right angles to one another, with the result that a total of four such basic structure sides connected to one another can form a cross-sectionally rectangular or square basic structure, as can be seen in FIG. 10, and which will be presently described.

The two respectively adjacent basic structure sides 1a and 1b are connected to one another in an articulated manner via the plastic material 7, whereby in the vertex region of each V-groove 9, the plastic material 7 forms a film hinge 11 in order for it to be possible for the two basic-structure sides 1a and 1b to be pivoted toward one another until the V-groove 9 has closed, whereupon the flanks of the V-groove 9 form miter surfaces or joint surfaces located one upon the other.

FIG. 5 shows the end position of two pivotally connected basic structure sides 1a and 1b. In accordance with the pivoting of the two basic structure sides 1a and 1b relative to one another, the plastic material 7 has deformed into an angled or externally rounded edge strip which forms the outer corner edge 12 of the two adjacent basic structure sides 1a and 1b. The edge strip, which adjoins the outer sides 3 of the basic structure sides 1a and 1b in a flush manner, is incorporated firmly in recessed regions 4a and 4b of the basic structure sides 1a and 1b by virtue of the fact that the plastic material 7 grips the material of the basic structure sides 1a and 1b. The recessed regions 4a and 4b are formed by the flanks of the grooves 4 which are initially parallel to one another and, once the adjacent basic structure sides 1a and 1b have been pivoted, are at right angles to one another.

Figure 7:
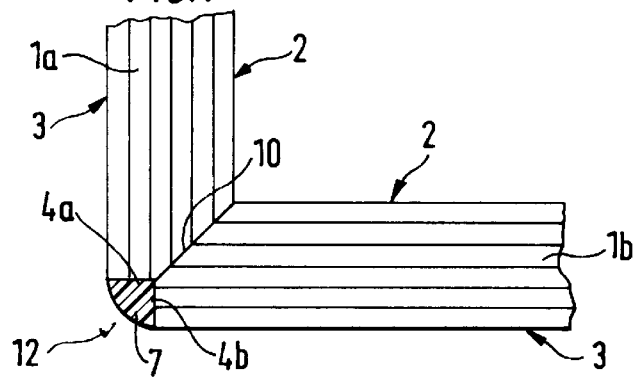
FIG. 7 is a fragmentary cross-sectional view of the panel of FIG. 4, after the panel has been pivoted to form the corner of a structure.

As has been previously described, the V-groove 9 is advantageously cut right into the plastic material 7 as shown in detail in FIG. 6. The flanks 10 of the V-groove 9 converge from the inner side 2 to the outer side 3 of the basic structure sides 1a and 1b such that they come together theoretically in the plane of the outer side 3, so that their vertex line would be located in the plane of the outer side 3. This vertex line is the pivot center about which the two basic structure sides 1a and 1b are swung towards one another. Although the flanks 10 of the V-groove 9 extend to the plastic material 7, they do not extend as far as the outer side 3 of the basic structure sides 1a and 1b. In this respect, the plastic material 7 forms a sufficiently thick film hinge 11 in the region of the pivot center, whereby when the basic structure sides 1a and 1b are pivoted into that position, as illustrated in FIG. 7, a relatively large volume of the plastic material 7 has to be deformed in the region of the film hinge 11. In order to prevent disadvantageous displacement, the two groove flanks 10 adjoin one another in the region of the plastic material 7 via a groove base 14 which is parallel to the outer sides 3 of the basic structure sides 1a and 1b and is of a certain width. As shown in FIG. 7, once the two basic structure sides 1a and 1b have been pivoted together, the miter joint, which is formed by the groove surfaces 10, extends into the region of the plastic material 7. The cutout in the region of the plastic material 7 avoids tearing of the deforming plastic material 7 when the basic structure sides 1a and 1b are pivoted and it is thus possible to influence the outer form of the corner edge 12 between the two swung-together basic structure sides 1a and 1b.

A special milling tool is used for the purpose of providing the V-grooves 9 corresponding to the contour according to FIG. 6. The V-grooves 9 are cut basically using a conical milling tool which, for the configuration of the V-grooves 9 according to the embodiment of FIG. 6, is designed as a truncated cone. This milling tool thus has a cross-sectional shape which corresponds to the cross-section of the V-grooves 9 with flattened tips.

Figure 8:
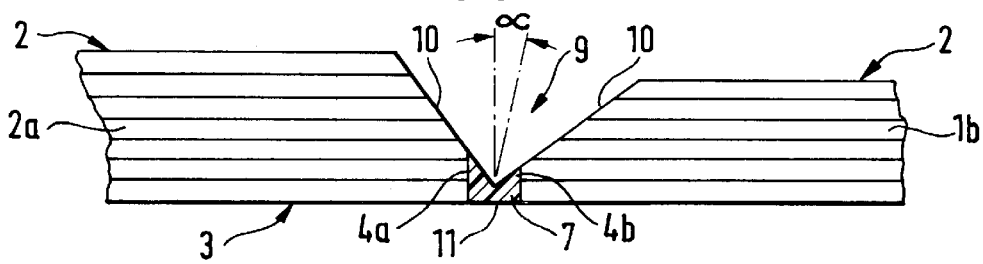
FIG. 8 is a fragmentary cross-sectional view of another alternative embodiment of the panel of FIG. 1.
Figure 9:
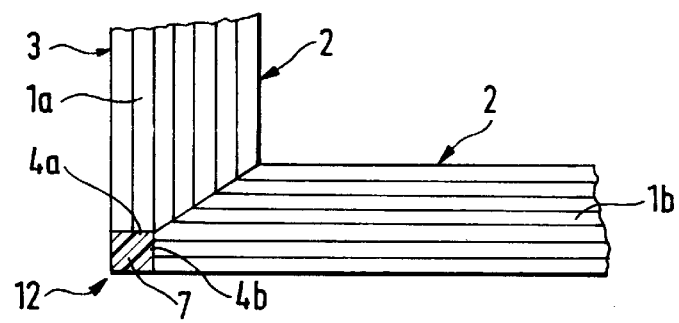
FIG. 9 is a fragmentary cross-sectional view of the panel of FIG. 8, after the panel has been pivoted to form the corner of a structure.

FIG. 8 shows a special feature which is used when the basic structure sides 1a and 1b are formed from initially separate panel parts which are of different thicknesses. Thus, the basic structure side 1a is thicker than the second basic structure side 1b. The initially separated panel parts are processed in the manner described above. They are fixed with respect to one another with their narrow surface sides butting against one another, whereupon the groove 4, with the remaining recessed regions 4a and 4b, is formed and injection-filled with the plastic material 7 in the manner described. As a result, the panel parts which form the basic structure sides 1a and 1b are connected to one another. The V-groove 9 is then formed in order that the panel parts can be pivoted towards one another through 90 degrees in the manner described, whereupon they assume the position shown in FIG. 9. In this case, however, it is necessary to compensate for the different panel thicknesses of the basic structure sides 1a and 1b, which is achieved by a particular way of providing the V-groove 9. The V-groove 9 has its plane of symmetry running along its longitudinal center and tilted about the angle a indicated in FIG. 8 with respect to the plane which is perpendicular to the inner sides 2 and the outer sides 3 of the panel parts. Despite different thicknesses of the panel parts which form the basic structure sides 1a and 1b, the two groove flanks 10 are of the same width and thus, once the basic structure sides 1a and 1b have been fitted together, the sides 1a and 1b butt congruently against one another, as is shown in FIG. 9. This avoids any protrusion on the inner side 2 of the basic structure sides 1a and 1b.

It is also possible for basic structure sides 1a and 1b made of panel parts of the same thickness to be connected to one another and pivoted toward one another once the V-groove 9 has been formed, although in this case it is not necessary for the V-grooves 9 to be tilted. The particular advantage is that use can always be made of the panel parts in the form of leftover pieces and it is not necessary for all the basic structure sides required for a basic structure to be produced from one, single-piece panel. It is basically possible for all of the basic structure sides to be formed from initially individual panel parts. It is likewise possible for a panel whose width is sufficient for two or three basic structure sides to be combined with a further panel or a panel part in order to form all of the basic structure sides required, which can be connected to one another and pivoted via the plastic material 7 in the manner described above.

Figure 11:
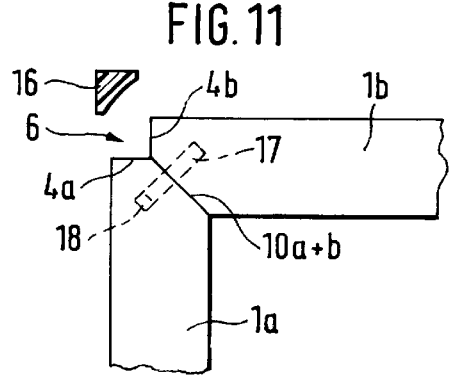
FIG. 11 is a fragmentary end view showing one of the four corner edges of the panel of FIG. 10.

FIG. 10 shows a basic furniture structure shortly before being definitively joined together. The basic furniture structure comprising four basic structure sides 1a and 1b which, in the definitively joined position, are at right angles to one another, whereby the finished basic structure has a rectangular or square cross-section. Irrespective of whether the basic structure sides 1a and 1b are formed from a single starting panel or from panel parts which are joined to one another and connected to one another in the manner described, it is possible in the initially flat, planar arrangement merely to provide the pivot hinges and prepare the corner edges 12 wherever a basic structure side 1a and a basic side 1b adjoin one another. The two longitudinal edges 15 of the composite arrangement of the basic structure sides 1a and 1b with the longitudinal edges being located on the outside at both ends in the starting position, have to be joined together at the fourth corner edge, which is illustrated in a slightly open state in FIG. 10. In the flat, starting position, these longitudinal edges are thus cut with a contour which in each case corresponds to half the boundary on one side of the grooves 4 and of the V-grooves 9. This produces recessed regions 4a and 4b here as well which are at right angles to one another in the joined-together arrangement, as shown in FIG. 11. Further, flanks 10a and 10b in the same way as flanks 10 of the V-groove 9 form a miter joint 10a and 10b in the joined-together position. In order that the basic structure is provided with the same formation at this fourth corner edge as at the other three corner edges 12, plastic material, for example in the form of a plastic strip 16, is introduced into the recess 6 formed by the recessed region 4a and 4b and said plastic strip can be welded in, inter alia, by being heated in order to achieve, in particular in the region of the fourth corner edge, the same outward appearance as the other three corner edges 12.

For the purpose of folding the basic furniture structure together by mechanical means, it may be necessary for the region of the flanks 10a and 10b of the outer longitudinal edges 15 of the composite arrangement of the basic structure sides, which flanks are to be joined together, to be provided with centering means so that in the joined-together arrangement the flanks 10a and 10b are located congruently one upon the other. As is shown in FIG. 11, a peg 17 is positioned in the region of one flank 10b in the basic structure side b. The peg 17 projects from the flank 10b in the joining direction. Correspondingly, the basic structure side 1a has, in the region of its flank 10a, a peg hole 18 which is aligned in the joining direction.

Depending on which surface coating is provided on the outer side 3 of the basic structure sides 1a and 1b, the plastic material forming the corner edges 12 may be of matching or contrasting color. In the case of the outer sides 3 of the basic structure sides 1a and 1b being veneered or coated with imitation wood, a single color or mottled corner edge 12 may be obtrusive and in these cases in particular it is therefore possible to provide the plastic material 7 with printing. This is most easily done when the complete arrangement of the basic structure sides 1a and 1b is still in the flat state, as long as the plastic material 7, injected into the grooves 4, has its outer surface located flush in a plane with the outer sides 3 of the basic structure sides 1a and 1b. For this purpose the grooves 4 are rested on a so-called stamping strip which when on its side comes into contact with the plastic material 7 and has a color coating which is transferred onto the plastic material 7, for which purpose contact pressure may be provided.

The foregoing specific embodiments of the present invention as set forth in the specification herein are for illustrative purposes only. Various deviations and modifications can be made within the spirit and scope of this invention, without departing from the main theme thereof.

I claim:

1. A process for producing furniture structures comprising the steps of:
   preparing at least a single panel having an outer surface and an inner surface;
   cutting a first groove in said outer surface of said panel;
   injecting an initially liquid plastic material into said first groove thereby forming a film hinge;
   cutting a V-groove in said inner surface of said panel, with said V-groove having a vertex in alignment with said first groove and thereby forming panel portions on opposite sides of said V-groove;
   pivoting said panel portions toward one another thereby forming a corner structure.

2. The process as claimed in claim 1, wherein said step of preparing a single panel further includes preparing a pair of panels each having a narrow edge and further comprising the step of;
   fixing said narrow edges of said pair of panels one to another with said step of fixing said narrow edges of said pair of panels immediately following said step of preparing said pair of panels.

3. The process as claimed in claim 2, wherein said step of preparing a pair of panels further includes:
   preparing a pair of panels having different thicknesses and in which said step of cutting a V-groove having two flanks in said inner surface further comprises tilting the plane of symmetry of said V-groove such that the two flanks in said V-groove are of the same width.

4. The process as claimed in claim 1, further comprising the step of:
   positioning said outer surface of said panel against an abutment thereby sealing said first groove, following the step of cutting a first groove.

5. The process as claimed in claim 4, wherein said abutment further comprises an injection channel and in which said step of injecting an initially liquid plastic material into said first groove further comprises the step of:
   injecting an initially liquid plastic material into said first groove through said injection channel.

6. The process as claimed in claim 1, further comprising the step of:
   positioning said outer surface of said panel against an abutment which forms a rest for said panel and thereby sealing said first groove following the step of cutting a first groove.

7. The process as claimed in claim 1, further comprising the step of:
   forming at least one injection channel leading from said inner surface of said panel to said outer surface of said panel and, with said step of injecting an initially liquid plastic material into said first groove, further comprising the step of:
   injecting an initially liquid plastic material into said first groove from said inner surface of said panel and in which said step of cutting a V-groove in said inner surface of said panel additionally comprises cutting away said injection channel formed in said panel immediately preceding the step of cutting a first groove in said outer surface of said panel.

8. The process as claimed in claim 1, further comprising the step of:
   forming at least one injection channel leading from said inner surface of said panel to said outer surface of said panel and, with said step of injecting an initially liquid plastic material into said first groove, further comprising the step of:
   injecting an initially liquid plastic material into said first groove from said inner surface of said panel and in which said step of cutting a V-groove in said inner surface of said panel additionally comprises cutting away said injection channel formed in said panel immediately following the step of cutting a first groove in said outer surface of said panel.

9. The process as claimed in claim 7, further comprising the steps of:
   applying a panel-sealing lamination on said inner surface of said panel, and
   cutting a venting groove in said panel-sealing lamination immediately following said step of preparing a single panel.

10. The process as claimed in claim 1, wherein said step of cutting a first groove in said surface of said panel further comprises the step of:
    cutting a first square groove.

11. The process as claimed in claim 10, wherein said V-groove has a flat tip.

12. The process as claimed in claim 1, wherein said step of cutting a first groove in said surface of said panel further comprises the step of:
    cutting a first rectangular groove.

13. The process as claimed in claim 1, wherein said V-groove comprises a theoretical vertex extending from the X-plane of said outer surface of said panel.

14. The process as claimed in claim 1, further comprising the step of:
    applying edge strips to edges of said panel after said step of preparing a single panel.

15. The process as claimed in claim 1, following said step of injecting an initially liquid plastic material into said first groove, further comprising the step of:
    applying color to said initially liquid plastic material following said step of injecting an initially liquid plastic material into said first groove.

16. The process as claimed in claim 1, further comprising the step of:
    resting said first groove on a stamping sheet having a color coating for transfer onto said plastic material in said first groove following said step of injecting an initially liquid plastic material into said first groove.

17. A process for producing furniture structures comprising the steps of:

preparing a single panel having an outer surface and an inner surface;

cutting a first, a second and a third groove in said outer surface of said panel;

injecting an initially liquid plastic material into said first, second and third grooves, thereby forming film hinges;

cutting a first, a second and a third V-groove in said inner surface of said panel, with said V-grooves each having a vertex in alignment with said first, said second and said third grooves, respectively, and thereby forming panel portions on opposite sides of each of said V-grooves;

cutting fourth and fifth grooves in said outer surface of said panel with said fourth and fifth grooves disposed on free outside edges of said panel;

cutting a half V-groove on outer surfaces of said panel disposed in alignment with each of said fourth and said fifth grooves;

pivoting panel portions adjacent said V-grooves toward each other thereby forming a structure;

joining free ends of said panel portions with said fourth and said fifth grooves, thereby forming a common groove; and injecting an initially liquid plastic material into said fourth and said fifth grooves.

18. The process as claimed in claim 17, prior to the step of joining said free ends of said panel portions, further comprising the steps of:

inserting a peg in a first of said free ends of said panel portions; and forming a peg receiving opening in a second of said panel portions.

19. A process for producing furniture structures comprising the steps of:

preparing a single panel having an outer surface and an inner surface;

cutting a first, a second and a third groove in said outer surface of said panel;

injecting an initially liquid plastic material into said first, second and third grooves, thereby forming film hinges;

cutting a first, a second and a third V-groove in said inner surface of said panel, with said V-grooves each having a vertex in alignment with said first, said second and said third grooves, respectively, and thereby forming panel portions on opposite sides of each of said V-grooves;

cutting fourth and fifth grooves in said outer surface of said panel with said fourth and fifth grooves disposed on free outside edges of said panel;

cutting a half V-groove on outer surfaces of said panel disposed in alignment with each of said fourth and said fifth grooves;

pivoting panel portions adjacent said V-grooves toward each other thereby forming a structure;

inserting a peg in a first of said free ends of said panel portions; and forming a peg receiving opening in a second of said panel portions;

joining free ends of said panel portions with said fourth and said fifth grooves, thereby forming a common groove; and injecting an initially liquid plastic material into said fourth and said fifth grooves.

* * * * *